June 30, 1970     W. B. GLENDINNING     3,518,133
METHOD FOR MEASURING THE THICKNESS OF A DIFFUSED SURFACE LAYER
Filed June 1, 1967
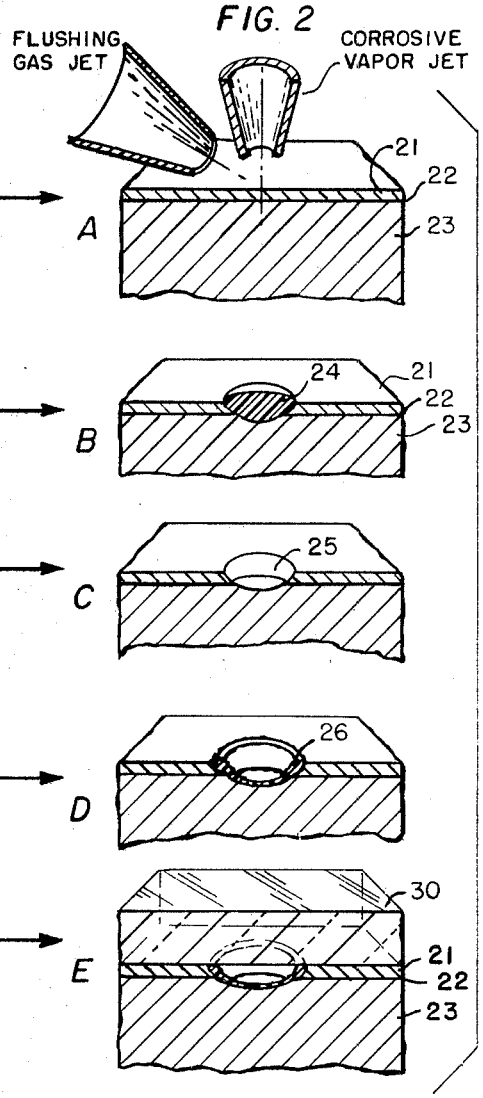
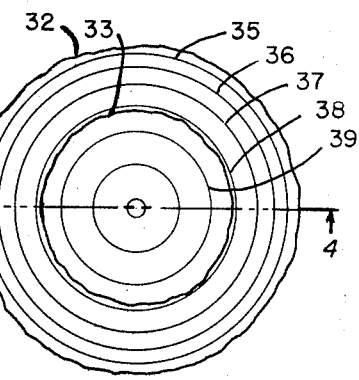
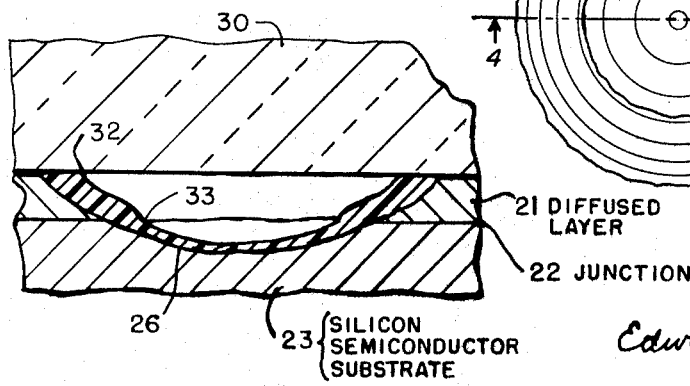
INVENTOR,
WILLIAM B. GLENDINNING.
ATTORNEYS.

United States Patent Office 3,518,133
Patented June 30, 1970

3,518,133
METHOD FOR MEASURING THE THICKNESS OF A DIFFUSED SURFACE LAYER
William B. Glendinning, Belford, N.J., assignor to the United States of America as represented by the Secretary of the Army
Filed June 1, 1967, Ser. No. 643,331
Int. Cl. H01l 7/50; G02f 1/34
U.S. Cl. 156—17                                                                5 Claims

ABSTRACT OF THE DISCLOSURE

This invention is a method for measuring the thickness of a diffused surface layer that forms a junction with a flat, silicon semiconductor. In this method, a very fine jet of hydrogen fluoride and other vapors are used to corrode through the diffused surface layer and the junction at a given point The excess vapors are flushed away with a jet of argon gas. The corroded portion of the surface layer and junction, at the given point, is washed away, in a bath of dilute sodium hydroxide, to leave a crater. An additional jet of the same corrosive vapors is directed at the crater to produce a microscopic, delineating layer within the crater. A flat, optical plate placed over the crater produces a series of interference pattern rings within the crater when lighted with monochromic light. The number of such rings between the outer surface and the junction indicates the thickness of the diffused surface layer at that point.

---

This invention relates to silicon semiconductors, and particularly, to silicon semiconductors having a junction between a substrate and a microscopic, diffused, surface layer. More particularly, this invention relates to a method for measuring the thickness of a diffused layer on the surface of a silicon, semiconductor, junction device.

The prior art of measuring the thickness of a diffused surface layer includes mechanical angle lapping, or cutting the layer on an angle so that the exposed layer can be stained and measured to compute the true thickness. Here the cutting or lapping process produces abrasive material and other contaminants that may affect the other parts of the surface. Also the dye or stain applied to the layer to make it visible for measuring purposes would inherently contaminate the materials. Consequently, the portion prepared for measuring must be cut off from the rest of the sample, before it can be put to use, which reduces the usable size and precludes measurements, other than at the edge, by the mechanical process. Furthermore, the mehcanical lapping requires at least ⅛ to 3/16 of an inch of surface for effective measurement, whereas this subject method requires a surface area of only about 15/1000 of an inch in diameter.

The prior art also includes infrared measuring techniques where the changing angle of incidence between peaks at a series of points is determined to compute the thickness of the diffusion layer. This method is nondestructive but it requires a large area and is restricted to those semiconductors whose layers differ in doping levels by a factor of three, whereas both the P and the N layers commonly have approximately the same doping levels.

The prior art also includes electronic measuring techniques, but they are time-consuming as well as destructive.

It is, therefore, an object of this invention to provide an improved measuring device for determining the thickness of the diffused surface layer on a semiconductor.

It is a further object of this invention to provide an improved, nondestructive method for measuring the thickness of the diffused surface layer of a semiconductor.

It is a further object of this invention to provide an improved method for measuring the thickness of the diffused layer on the surface of a semiconductor that requires an extremely small surface area, and, that provides a reading directly in microns.

It is a further object of this invention to provide an improved means for physically exposing the junction near the surface of a semiconductor to facilitate measurement of the thickness of the diffused surface layer above the junction without significantly damaging the device.

These and other objects of this invention are accomplished by: directing a fine jet of 1% by volume of hydrogen fluoride and other corrosive vapors at a point on the surface of the diffused layer above the junction of a silicon semiconductor that is positioned in a suitable, inert container; driving off the excess corrosive vapors with a flushing jet of argon gas; washing off the resulting corroded portion of the semiconductor with a dilute bath of sodium hydroxide to reveal a crater extending through the diffused surface layer and its junction with the semiconductor; redirecting the fine jet of corrosive vapors at the crater for a short time to produce a delineating layer within the crater; placing an optically-flat, transparent plate over the crater; and viewing the crater through a microscope under monochromatic light to observe the resulting concentric ring pattern which is an indication of the thickness of the layer in terms of wavelengths of the monochromatic light.

This invention will be better understood and further objects of this invention will become apparent from the following specification and the drawings of which:

FIG. 1 shows a series of blocks labeled to describe the sequence of steps in this process.

FIG. 2 shows a series of pictorial drawings with cross-sections of a small portion of a sample of the semiconductor and associated apparatus to illustrate the positioning of the apparatus and the change in the semiconductor during the process.

FIG. 3 is an enlarged, plan view of the crater in the surface during the optical measurement, and FIG. 4 is a cross-section of a portion of the material surrounding the crater in the semiconductor of FIG. 3.

Referring now particularly to FIG. 1, the first step of this process is positioning the sample of semiconductor with respect to the corrosive vapor jet and the flushing gas jet as shown in FIG. 2A. The silicon semiconductor sample has a substrate 23, a diffused surface layer 21, and an intervening junction 22.

A P type surface layer will have one of the group 3 elements, usually boron, aluminum or gallium, as an impurity. An N type layer will have an impurity from the group 5 elements, usually phosphorus or arsenic. These layers in junction devices, and the methods for making them, are well known, and are described in detail in Volume IV of the Technical Document Report No. ASD–TDR–63–316 on "Integrated Silicon Device Technology" by Research Triangle Institute.

The second step of FIG. 1 is exposing a point on the surface of the sample to the corrosive vapors from the corrosive vapor jet of FIG. 2A. These vapors comprise 1% by volume, each, of hydrogen fluoride, nitrous oxide, and water, in a carrier gas such as argon at a temperature between 25 and 30 degrees centigrade. This produces a minute, corrosive growth 24 in FIG. 2B through the diffused surface layer 21 and junction 22. Simultaneously, the residual corrosive vapor is driven away from the surface by the pressure of argon gas from the flushing gas jet to confine the reaction between the corrosive vapor and the semiconductor sample to the desired area.

The third step of FIG. 1 is washing the surface of the sample in a bath of 10 percent sodium hydroxide solution at 25 degrees centigrade. This may require the removal of the jets for access to the surface, or the removal of the sample to a suitable sink, or container, for the handling of the washing liquids. The washing process dissolves the corrosive growth 24 of FIG. 2B to leave a crater 25 seen in FIG. 2C.

The fourth step, after repositioning the sample and jets as in step 1, is re-exposing the crater 25 to the same corrosive vapor jets and the flushing gas jet of step 2 for a comparatively short time. This is only intended to produce the thin film or delineating layer 26 of FIG. 2D on the surface within the crater. This can be more clearly seen in the enlarged cross-section of FIG. 4.

It may be noted at this point that the rate of growth of the delineating layer on the material of the diffused surface layer is greater than the rate of growth of the delineation layer on the material of the substrate of the silicon semiconductor. This difference in growth produces a noticeable change 33 in the contour of the surface of the delineating layer where it crosses the junction between the two materials. This change in contour 33 provides a visible indication of the position of the junction to make the reading of the thickness of the diffused surface layer more positive.

The fifth step is covering the crater and delineating layer with an optical flat, as seen in FIG. 2E, for the actual depth or thickness measurements. This is also seen, in an enlarged scale, in the cross-section of FIG. 4.

It should be noted here that the lower surface of the optical flat must rest in close contact with the upper surface of the diffused surface layer surrounding the crater, and as close as possible to the outer, upper, peripheral edge 32 of the delineating layer in the crater. This is essential since the ultimate depth indications will be between the surface of the delineating layer and the lower surface of the optical flat.

The sixth and last step of this method is exposing the optical flat to monochromatic light at the crater. This produces a series of interference rings within the crater where the depth between the lower surface of the optical flat and the upper surface of the delineating layer is a multiple of the half-wavelength of the monochromatic light.

FIG. 3 shows only the crater area itself, seen from above during measurement, and no attempt is made to indicate the optical flat; or the other surface of the semiconductor; or any peripheral limits.

FIG. 3 illustrates the general appearance of the crater viewed under monochromatic light. The upper rim of the crater—or, actually, where its delineating layer meets the surface of the diffused layer—is the ring 32, and the noticeable change in the surface of the delineating layer that marks the junction between the diffused surface layer and the substrate of the silicon semiconductor sample is the ring 33. The number of interference pattern rings between the outer ring 32, which is in contact with the lower surface of the optical flat, and the ring 33 that marks the position of the junction, is a measure of the depth of the junction, or the thickness of the diffused surface layer at this point. This tangible number of interference pattern rings can be read directly in angstroms and can obviously be converted to any desired terms.

A convenient monochromatic light is green, at 5400 angstroms, which will give about 4 interference rings within the depth of the normal, diffused surface layer.

Since the size of the crater is in the order of 15 to 40/1000 of an inch in diameter, and there will be several interference rings within that diameter, it is obvious that microscopic techniques must be used to observe and count the interference rings.

Typical interference pattern rings such as 35 through 38 between the outer surface ring 32 and the junction ring 33 indicate that the depth of the diffused surface layer, in this case, would be slightly over four times the half-wavelength of the monochromatic light. Other rings such as 39 will also appear in the lower portion of the crater surface and indicate the overall depth of the crater.

FIG. 4 is an enlarged cross-section taken through the center of the crater shown in FIG. 3, as indicated. Here the various layers and surfaces adjacent to the crater are shown and it should be obvious that the optical flat, the diffused surface layer, and the substrate extend well beyond the area.

The depth of the crater depends on the time of exposure to the corrosive vapors, as well as on the concentrations, temperature and other factors. The process must, of course, be continued long enough for the corroded portion, and the ultimate crater, to penetrate through the junction between the diffused surface layer and the substrate. For a normal, diffused, surface layer of from 1 to 2 microns, the sample should be exposed to the corrosive vapors for from 3 to 6 minutes for the corroded portion to reach this depth.

The wash in dilute, sodium hydroxide takes less than a minute to dissolve the corroded portion, and the re-exposure of the crater to corrosive vapors takes less than 30 seconds to produce the thin layer that delineates the junction of the diffused surface layer and the substrate.

What is claimed is:

1. A method for measuring the thickness of a diffused surface layer on a silicon semiconductor substrate comprising the steps; exposing said diffused surface layer to a fine jet of corrosive vapors of hydrogen fluoride and nitrous oxide for a sufficient time to produce a corroded portion through said diffused surface layer; washing said corroded portion out of said diffused surface layer with a dilute alkaline solution to leave a crater extending through said diffused surface layer and into said substrate; re-exposing said crater to said corrosive vapors for a relatively short time to produce a thin, delineating layer on the surface within said crater; covering said crater with an optical flat; exposing said crater and said optical flat to monochromatic light; and counting the number of interference rings between the outer edge of said crater and said substrate.

2. A method for measuring the thickness of a diffused surface layer on a semiconductor substrate as in claim 1 wherein said corrosive vapors consist of 1% by volume of hydrogen fluoride, nitrous oxide and water, in argon gas, at 25 degrees centigrade.

3. A method for measuring the thickness of a diffused surface layer on a semiconductor substrate as in claim 1 wherein said dilute alkaline solution comprises dilute sodium hydroxide at 25 degrees centigrade.

4. A method for measuring the thickness of a diffused surface layer on a semiconductor substrate as in claim 1 wherein said diffused surface layer is exposed to said fine jet of corrosive vapors for about 4 minutes, said diffused surface layer is washed with said dilute alkaline solution for about 1 minute and said crater is re-exposed to said corrosive vapors for about 30 seconds.

5. A method for measuring the thickness of a diffused layer on a semiconductor substrate as in claim 1 wherein a second jet of argon gas is directed to said diffused surface layer of said semiconductor along with said fine jet of corrosive vapors to drive the excess of said corrosive vapors away from contact with other portions of said semiconductor.

References Cited

UNITED STATES PATENTS 2,693,735  11/1954  Zehender _____ 88—14
3,243,323   3/1966  Corrigan et al. _____ 156—17

JACOB STEINBERG, Primary Examiner

U.S. Cl. X.R.

148—1.5; 350—285